(12) United States Patent
Joneid

(10) Patent No.: US 7,264,714 B2
(45) Date of Patent: Sep. 4, 2007

(54) PROTEIN SKIMMER

(75) Inventor: Steinar Joneid, Fredrikstad (NO)

(73) Assignee: Clarity WTS, Saghellinga (NO)

( * ) Notice: Subject to any disclaimer, the term of this patent is extended or adjusted under 35 U.S.C. 154(b) by 260 days.

(21) Appl. No.: 11/004,908

(22) Filed: Dec. 7, 2004

(65) Prior Publication Data
US 2005/0183998 A1 Aug. 25, 2005

(30) Foreign Application Priority Data

Feb. 5, 2004 (NO) .................... 20040521
Sep. 29, 2004 (NO) .................... 20044144
Oct. 15, 2004 (NO) .................... 20044386

(51) Int. Cl.
C02F 1/40 (2006.01)
A01K 63/04 (2006.01)

(52) U.S. Cl. ................. 210/167.21; 210/259; 210/263; 210/416.2; 210/776; 210/805; 210/905

(58) Field of Classification Search .......... 210/167.01, 210/167.21, 259, 263, 416.1, 905, 416.2, 210/767, 776, 805, 252, 167, 169; 119/226, 119/259, 260

See application file for complete search history.

(56) References Cited

U.S. PATENT DOCUMENTS 3,661,262 A 5/1972 Sanders
3,965,007 A * 6/1976 Conn et al. ................. 210/169
3,994,811 A 11/1976 Cohen et al.
4,620,929 A 11/1986 Hofmann
4,988,436 A 1/1991 Cole
5,182,018 A 1/1993 Langston
5,628,905 A 5/1997 Montalbano
5,736,034 A 4/1998 Phillips et al.
6,156,209 A 12/2000 Kim
6,303,028 B1 10/2001 Marks et al.
6,436,295 B2 * 8/2002 Kim ........................... 210/703

FOREIGN PATENT DOCUMENTS

EP 0 017 888 10/1980
WO WO 01/32562 5/2001

* cited by examiner

Primary Examiner—Fred G. Prince
(74) Attorney, Agent, or Firm—Young & Thompson

(57) ABSTRACT

A protein skimmer for use in purification of water by culture of fish or other water organisms in a reservoir, aquarium or (2) with a circulation system comprising one or more discharge tubes (4) for water from the reservoir (2) to a pump (5) for circulation of the water, and a return tube (3) for water directly or indirectly from the pump (5) to the reservoir (2) The return tube (3) comprises at least one generally horizontal, straight portion (90) having one or more upwardly directed side branches (9) which has an opening (91) leading to air, in which the generally horizontal straight portion (90) is arranged for rapid passage of the water past. the side branch (9) and to have the water level at or above the intersection of the side branch (9) with the straight portion (90), and in which the side branch (9) is directed rearward relative to the direction of the water flow in the straight portion (90), and forms a first angle (v) with between 0° and about 90° with the straight portion (90).

26 Claims, 7 Drawing Sheets

PROTEIN SKIMMER

The present invention relates to a separator, also called a deskimmer or skimmer, for removal of protein from water in aquaculture installations and aquariums. In particular, the invention relates to a protein skimmer for water circulation in an aquaculture installation for edible fish or aquarium for relatively large amounts of aquarium fish, e.g., Koi fish, or other-fresh water fish species, or for other fresh water organisms, e.g. cray fish. The protein skimmer according to the invention may also be used for removing protein from sea water in culture tanks for marine organisms.

BACKGROUND OF THE INVENTION

One problem that the inventor has tried to overcome by means of the present invention is to reduce the supply of air to the water during the purifying process for removing protein from the water. If air is supplied to the water in the form of pressurized air or bubbles, much of the nitrogen gas in the air will be dissolved in the water. This may lead to undesired nitrogen content in the water. It is known that nitrogen dissolved in water inhibits fish growth, so it is desirable to keep the nitrogen content of the water sufficiently low so as to avoid inhibition of fish growth.

It belongs to the known art to remove particles and proteins from water by injecting air to form air bubbles in the water so as for the particles and proteins to bind to the bubbles and thereby be forced to the surface of which they may be skimmed off. The efficiency of this process depends on several factors, of which density and pH are important. pH is important as fresh water usually has a lower pH than salt water. This will reduce the electrical bindings formed between particles in fresh water. Traditionally, bubble formation for protein skimming has been made within the indicated salinity area from about 10 to about 50 parts per thousand, of which the bubble size would be between about 0.1 to about 1 mm. Fresh water also has a lower density than salt water, and this makes it more difficult to form small stable bubbles. The attached FIG. 12 shows an area for bubble sizes formed for different salinities of water. It has been less usual to try to remove protein from water having salinity less than about 5 to 10 parts per thousand.

PRIOR ART

It belongs to the known art to use so-called "bubble stones" by pressing supplied air out through such a bubble stone under water. The bubbles thereby formed may have small diameters even though they are made in nearly fresh water, and may pick up some proteins from the water. The bubbles would however be unstable in fresh water and thereby combine to form larger bubbles so as to rapidly end up within large bubble sizes between about 2 mm and 5 mm as shown to the left part in the stable bubble size area shown in FIG. 12.

U.S. Pat. No. 3,661,262 (Sanders) relates to a filtering and circulation system for maintaining water quality in a mariculture tank (Engl.: "Filtration and circulation system for maintaining water quality in mariculture tank"). This US Patent shows a protein skimmer with reference numeral "20" in the upper right corner of the drawing, and further shows a similar Y tube connection which is mounted with the main tube direction arranged vertically and which is not used for discharge of water.

U.S. Pat. No. 3,965,007 (Conn et al.) describes a protein skimmer for use in an aquarium with re-circulation of water. It utilizes an air bubble injector in the bottom of a tube near the bottom of the water. Injection of bubbles is a disadvantage because of the danger of increased nitrogen content in the water, which usually leads to poorer fish growth. Bubbles in the water are more easily formed in fresh water and is not desirable because the fry may confuse air bubbles with feed particles.

U.S. Pat. No. 3,994,811 (Cohen et al.) shows in the same manner as U.S. Pat. No. 2,965,007 (Packard) a skimmer and carbon filtration unit in which pressurized air is supplied to the water in a desired depth and in which the water close to the top of the unit has an overflow for formation of foam and in which the water further runs down to the carbon filter. The supply of pressurized air is undesirable as explained above.

U.S. Pat. No. 4,988,436 (Cole) comprises a protein skimmer (shown in FIGS. 1 and 2 of the US Patent) with an air injection pump 71 and an air tube 129 to bubble diffusers 127 and 131, which form bubbles which gather in the extraction chamber 99 in which protein foam is collected. The disadvantage of the invention described in this US Patent is again the undesirable air injection.

U.S. Pat. No. 5,628,905 (Montalbano) describes a further protein skimmer with air injection to a porous bubble diffuser, please see reference numerals 41 in FIG. 3 and 4 in the US Patent.

U.S. Pat. No. 5,736,034 (Phillips) shows a tangential horizontal inlet for a mixture of water and air from a pump to a vertical tube having a larger diameter than the horizontal inlet, in which a vortex is formed, and in which the vortex is guided up through a central tube to the surface at which it is formed foam that may be skimmed. The present invention essentially differs from this.

U.S. Pat. No. 6,156,209 (Kim) shows a bubble chamber with air at the top. In the bubble chamber water is flushed down towards the surface of the water, in which foam is formed, gathers on the surface and rises up in a foam riser. Water having a less protein content is collected near the bottom of the bubble chamber. This US Patent does not show a rearward directed side branch of a water tube.

U.S. Pat. No. 6,303,028 (Marks et al.) shows protein foam formation at the water-air contact when an air/water mixture is circulated across a barrier within an inverted funnel. Protein foam is formed and oozes up and out through the upper, narrower opening of the funnel and may be drained from an upper tank. This does not show any straight portion on the discharge tube. Further, the US Patent requires admixture of air and does not show any rearward inclined side branch, as opposed to the present invention.

The above mentioned background art does not solve the problem which arises at a too large nitrogen content level in the fresh water, and which leads to reduced fish growth. The above publications further relate to methods for use in saline water. In saline water smaller-bubbles will form than would be the case in fresh water. The bubble formation in fresh water creates bubbles of such size, see FIG. 12, that the fry may confuse bubbles and feed, which incurs that the fry may end up higher in the water than is favourable for the fry's light conditions, temperature, or the risk of being eaten, or that it receives insufficient amount of feed. In other words, there is a need for a protein skimmer that avoids the disadvantages with the above publications.

The protein skimmer according to the invention may also be used for sea water, as some recent experiments have indicated.

SHORT SUMMARY OF THE INVENTION

This invention relates to a protein skimmer for use in purification of water by culture or farming of fish or other water organisms in a reservoir, an aquarium, or a tank having a circulation system comprising one or more discharge tubes for water from the reservoir to a pump for circulation of the water, together with a return tube for water directly or indirectly from the pump to the reservoir.

The protein skimmer is characterized in that the return tube comprises a generally horizontal, straight portion having at least one upwardly directed side branch which has an aperture open to the air, in which the generally horizontal, straight portion is arranged for rapid passage of the water past the side branch and to have the water level at or above the intersection of the side branch with the straight portion, and in which the side branch is arranged in a rearward direction relative to the flow direction of the water in the straight portion of the pipe, and forms a first angle of between 0° and about 90° with the straight portion of the pipe.

During water flow, a protein foam will then be formed at the water surface at the intersection of the side branch with the straight portion of the return tube, and that the protein foam is allowed to grow from the water surface for discharge through the side branch, and in which the return tube further is arranged for the entirely or partially purified water to flow further through the straight portion and to be returned to directly or indirectly to the reservoir.

The invention further relates to a process for purification of fresh water or salt water by culture or farming of freshwater or salt water fish or other water-living organisms in a reservoir, by means of a protein skimmer, in which the process comprises the following steps:

supply of polluted or partially purified water to a return tube which leads to the reservoir, in which the return tube comprises a generally horizontal straight portion having one or more upwardly directed side-branches, each side branch having an aperture open to the air;

rapid flow of water past the side branch, while the water level is maintained at or above the intersection of the side branch with the straight portion, as the side branch is directed rearward relative to the flow direction of the water in the straight portion, and forms a first angle of between 0° and about 90° with the straight portion, so that a protein foam is formed at the water surface at the intersection of the side branch with the straight portion of the return tube, and that the protein foam is allowed to grow upwardly from the water surface for discharge through the side branch; and further flow of the entirely or partially purified water further to through the straight portion of the return tube and back directly or indirectly to the reservoir.

Further features of the protein skimmer and the process according to the invention are described in the corresponding independent claims.

SHORT DESCRIPTION OF THE DRAWINGS

The invention is illustrated in the accompanying drawings, which are intended to illustrate the invention only, and which should not be construed to limit the scope of the invention.

FIG. 1 is a schematic section in the vertical plane of a possible embodiment of an aquaculture or mariculture plant for fresh water fish, salt water fish or other water-living organisms with a reservoir for culture or farming of fish or other water organisms. A discharge tube for water is arranged from the reservoir to a pump for circulation of the water, together with a return tube for water from the pump to the reservoir. In this embodiment it is further shown a separator, herein shown a filter tank with a particle filter arranged between the discharge tube from the reservoir and the return tube to the reservoir. A side branch is arranged on a generally horizontal, straight portion in the return tube. The end or outlet of the return tube is here shown arranged in an upward, oblique angle relative to the horizontal main channel of the return tube.

Figure 7:
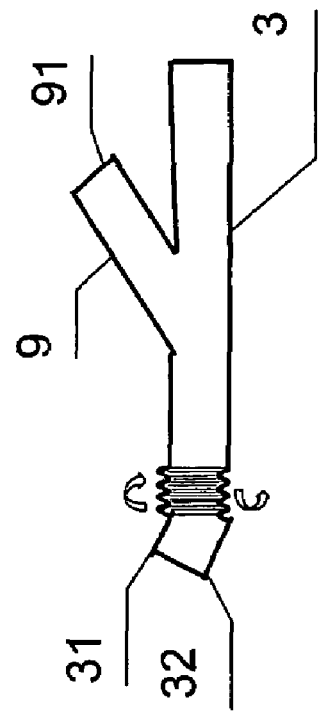

FIG. 7 shows a very simplified schematic vertical sectional view, in which an embodiment of the invention is shown in which the outlet of the return tube forms an oblique angle with the main channel of the return tube. In this embodiment it is possible to adjust the height by means of the intersection between the outlet and the main channel of the return tube being pivotable about the central axis through the main channel of the return tube.

Figure 8:
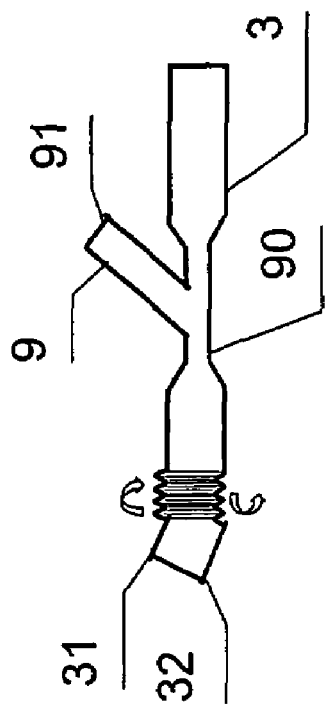

FIG. 8 shows a very simplified schematic vertical sectional view similar to FIG. 7, in which an embodiment of the invention is shown having the outlet of the return tube hinged articulated to the main channel of the return tube. In this embodiment of the invention the transition is shown articulated in the form of a flexible hose portion.

Figure 9:
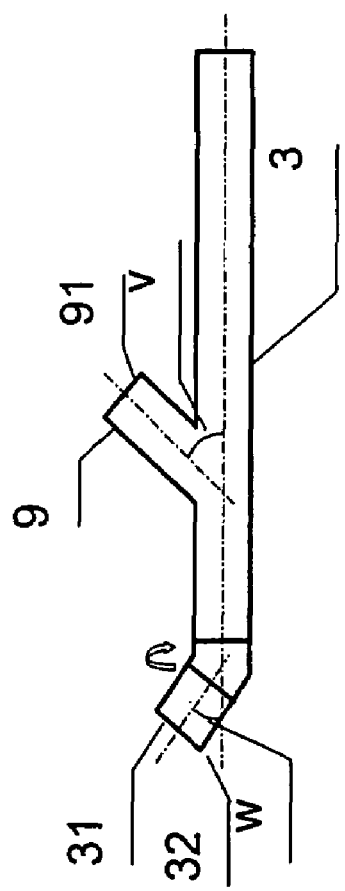

FIG. 9 shows a schematic sketch of a vertical sectional view similar to FIG. 7, in which the straight portion of the tube is arranged lower relative to the main channel of the return tube.

Figure 10:
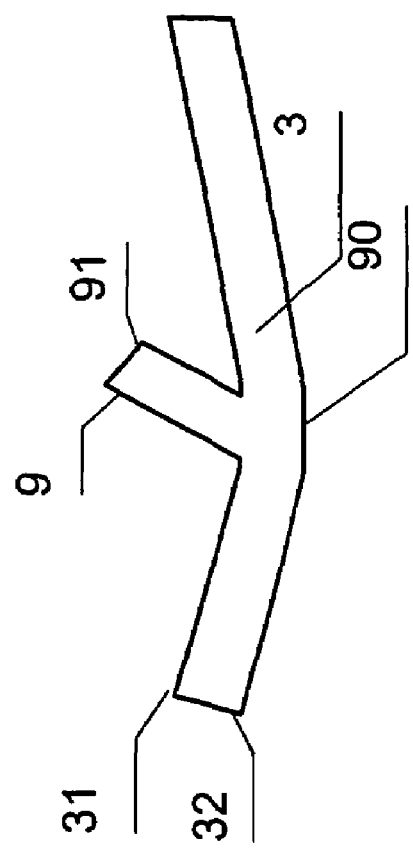

FIG. 10 shows a schematic sketch of a vertical sectional view similar to FIG. 8, in which the straight portion of the tube is constricted relative to the main channel of the return tube.

Figure 11:
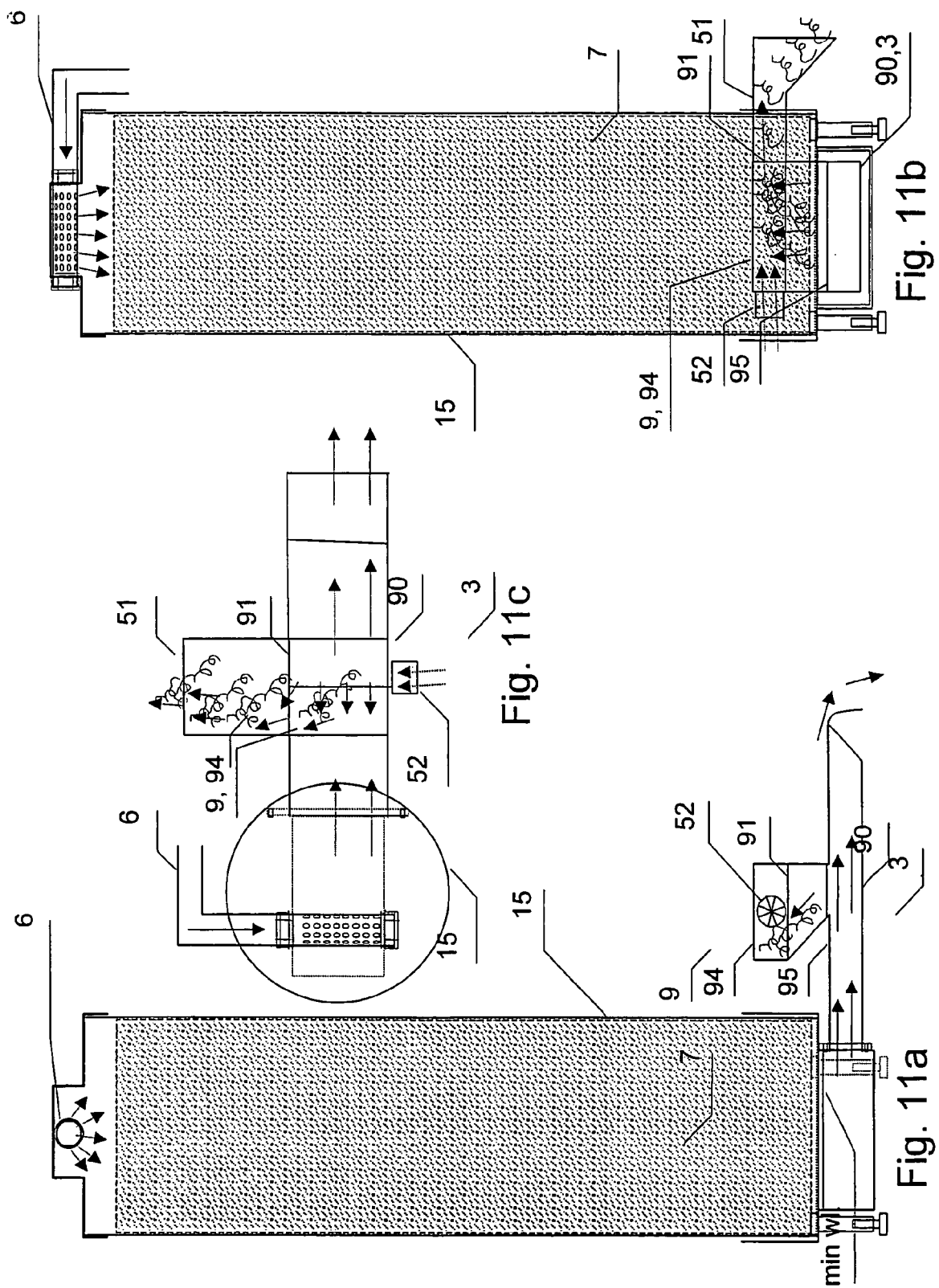

FIG. 11 shows an improved preferred embodiment of the invention in different views. FIG. 11A shows a partial vertical section and elevation view of an embodiment having an inlet pipe at the top, with several small holes for distributing water down through a particle filter, and a longitudinal section of an outlet pipe with a protein separator according to a preferred embodiment of the invention. FIG. 11B likewise illustrates a partial vertical section and elevation view of the same embodiment of the invention, partially seen in section and straight into the longitudinal axis of the outlet pipe, i.e. 90° relative to FIG. 11A. The water current is imagined to run outward toward the reader. FIG. 11C shows a horizontal section through the protein separator according to the invention, as seen directly from above.

Figure 12:
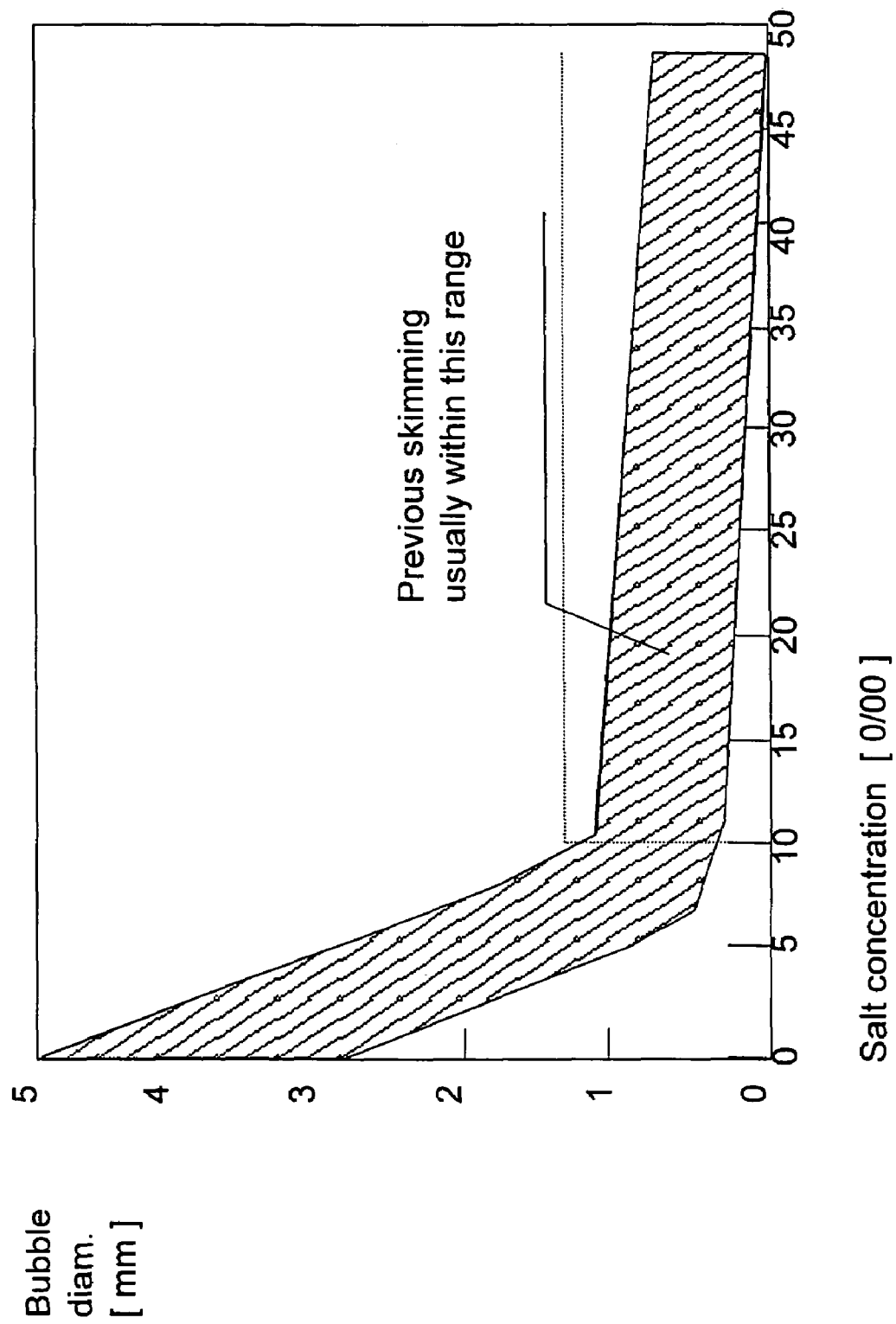

FIG. 12 is a Cartesian diagram showing air bubble diameter as a function of salinity in water.

A further description of the protein skimmer according to the invention will be given below, with reference to the accompanying drawings.

DESCRIPTION OF PREFERRED EMBODIMENTS

Figure 1:
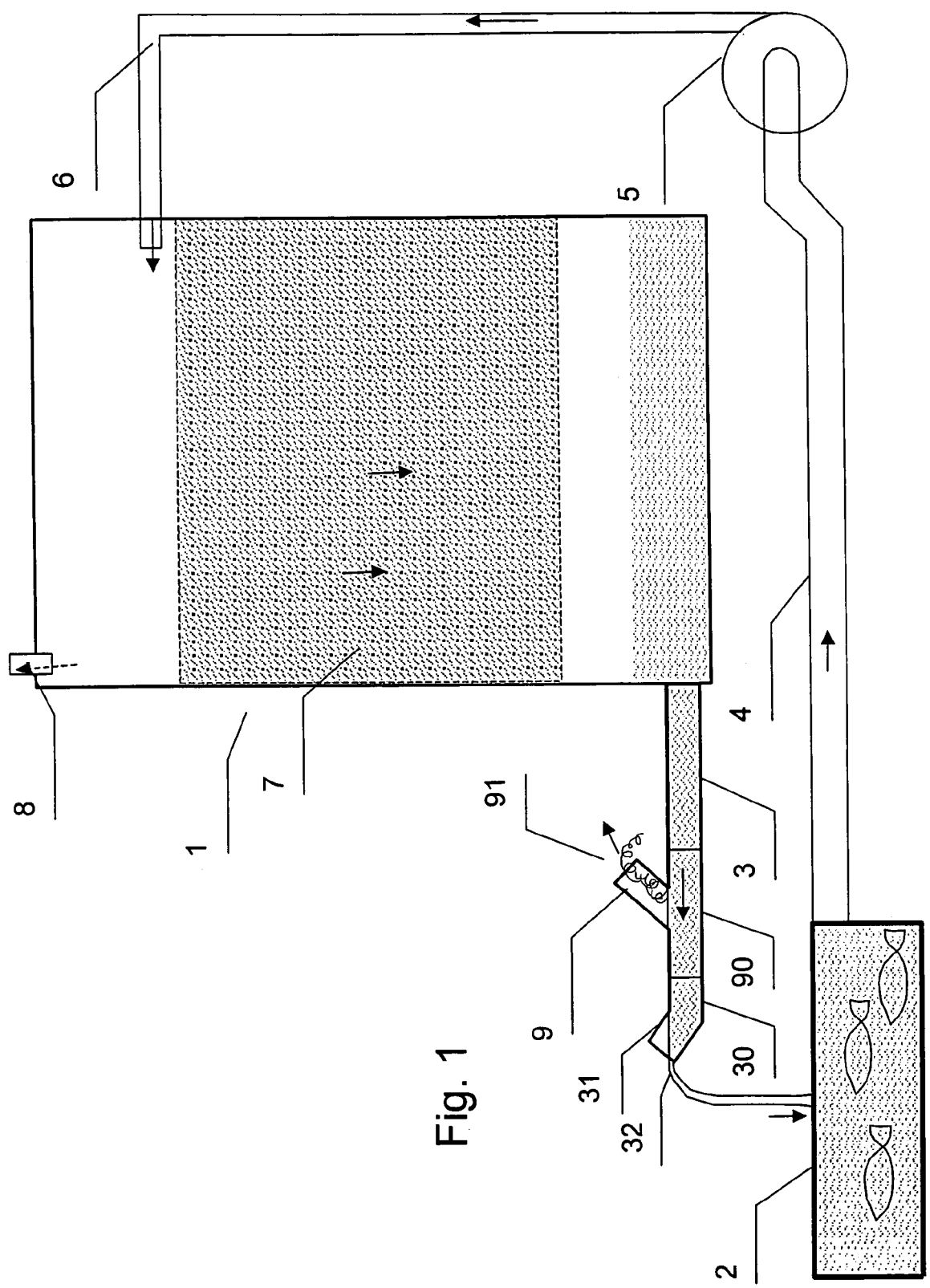

Reference is now made to FIG. 1, in which a simple aquaculture or mariculture installation with a reservoir 2 for culture of fresh water fish or salt water fish or other water-living organisms, with a protein skimmer according to a possible embodiment of the invention. A discharge tube 4 for water is arranged from the reservoir 2 to a pump 5 for circulation of the water, together with a return tube 3 for water from the pump 5 to the reservoir 2. Further in this embodiment it is shown a filter tank 1 with a particle filter 7 that is arranged between the discharge tube 4 from the reservoir 2 and the return tube 3 to the reservoir 2. A side branch 9 is arranged on a generally horizontal, straight portion 90 in the return tube 3. The end or outlet 31 of the return tube 3 is here shown arranged in an upward, oblique angle with respect to the horizontal main channel of the return tube 3.

The protein skimmer according to the invention is arranged for use by purification of fresh water or salt water by culture of fish or other water-living organisms in a reservoir 2. The aquaculture or mariculture installation is provided with a circulation system comprising one or more discharge tubes 4 for water from the reservoir 2, in which the discharge tube 4 leads further to a pump 5 for circulation of water, and a return tube 3 for guiding water directly or indirectly from the pump 5 to the reservoir 2, in a preferred embodiment via a filter 15, 7 as explained below.

The return tube 3 comprises a generally horizontal, straight portion 90 with at least one upwardly directed side branch 9, which has an opening 91 leading to air. The generally horizontal straight portion 90 is advantageously arranged for rapid passage of the water past the side branch 9 and further to have the water level at or above the intersection of the side branch 9 with the straight portion 90. The side branch 9 is directed rearward relative to the direction of the water flow in the straight portion 90, and forms a first angle of between 0° and about 90° with the straight portion 90, as shown in FIG. 1 and FIG. 7. The first angle v may advantageously be between 30° and 60°. It is also possible that the first angle v may be between 40° and 50°. However, in a preferred embodiment the first angle v is about 45°.

Figure 4:
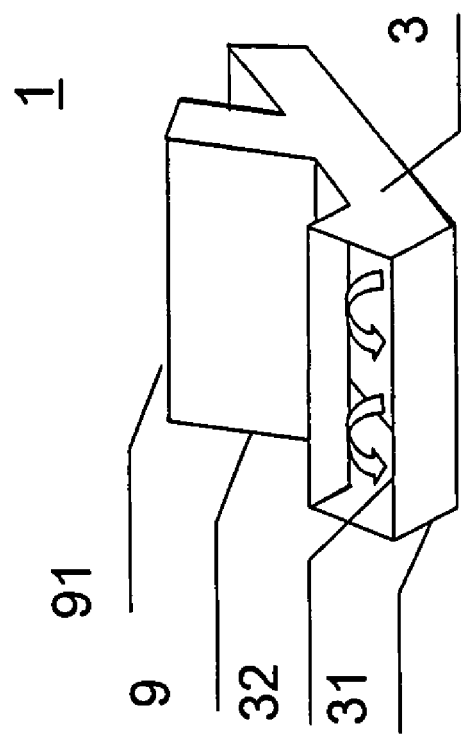
FIG. 4 is a very simplified schematic (partially transparent) perspective view which shows a section of an embodiment of the return tube with the straight portion, the side branch and the outlet of the return tube in another embodiment in which the cross sections of the straight portion, the side branch and the outlet of the return tube are generally quadrangular.
Figure 3:
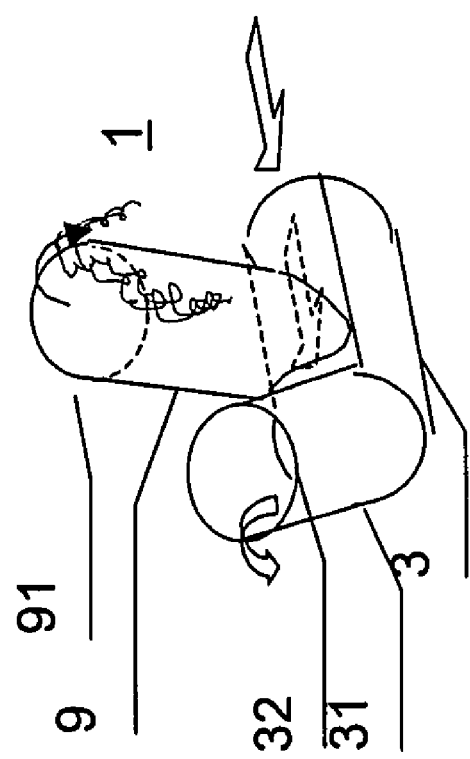
FIG. 3 is a very simplified schematic (partially transparent) perspective view which shows a section of an embodiment of the return tube with the straight portion, the side branch and the outlet of the return tube, in which the cross sections of the straight portion, the side branch and the outlet of the return tube are generally circular.

In one embodiment of the invention the side branch 9 may have a generally circular or elliptic cross section, but it may also advantageously have a generally quadrangular cross section, e.g. either squared or rectangular. Correspondingly, the straight portion may also have a generally circular or elliptical cross section, but the cross section may also advantageously be generally quadrangular, either squared or rectangular, because this would increase the intersection area between the main tube 3 and the side branch 9, in which intersection area the protein separation process is believed to take place. Two possible embodiments of the straight portion is shown in FIG. 3 and 4. Another alternative is to let the cross section of the side branch 9 and the cross section of the straight portion 90 be different, e.g., a combination of circular or elliptical cross section for the straight portion 90 and quadrangular cross section for the side branch 9, however, an inverted combination is also possible, i.e. in which the straight portion may have a quadrangular cross section and the side branch may have a circular or elliptic cross section.

During water flow, protein foam will be formed at the water surface at the intersection of the side branch with the straight portion 90 of the return tube 3. The protein foam is allowed to grow upwardly from the water surface for discharge through the side branch 9. The return tube 3 is further arranged to let the entirely or partially purified water flow further through the straight portion 90 and return directly or indirectly to the reservoir 2.

The protein skimmer according to the invention for the basin 2 does not necessarily be exclusively made for aquaculture or mariculture purposes, i.e. for commercial fish production or production of other fresh water or salt water organisms in the basin 2. The protein skimmer for use with the basin 2 may also comprise protein skimmers according to the invention for use with professional aquarium tanks for display of organisms to the public, or such protein skimmers sold to amateurs for use in a small aquarium, in which a return pipe 3 with a side branch 9 according to the invention is used in the circuit for separating proteins from the water.

Reference is now made to FIG. 9. From the figure it appears that the straight portion 90 also may be arranged on a lower level relative to the main channel of the return tube 3. An advantage thereby achieved is a higher pressure in the straight portion 90, so that a more efficient or rapid separation and removal of protein from the flowing water takes place.

Another possible embodiment is that the straight portion 90 may be constricted relative to the main channel of the return tube, as appears from FIG. 10. Water flow will then have a higher velocity through the constricted straight portion 90, however, a pressure drop will also take place across the constriction. It is likely that the protein skimming may be more efficient.

Figure 6:
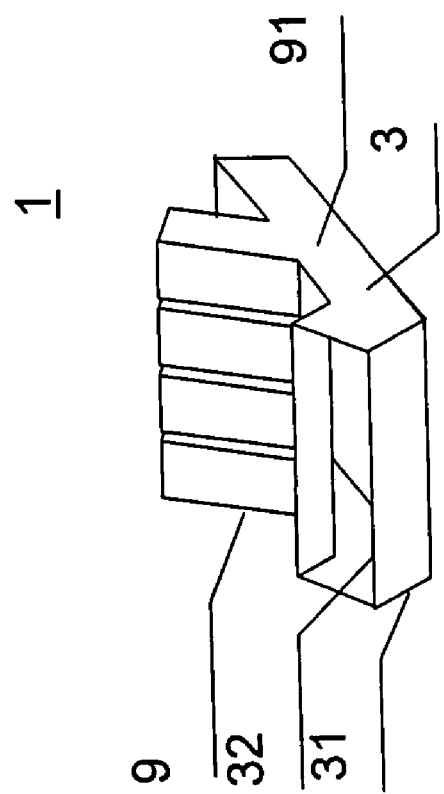
FIG. 6 is a very simplified schematic side view similar to 4, in which several side branches are arranged abreast of the tube, here shown in an embodiment in which four side branches are arranged side by side.
Figure 5:
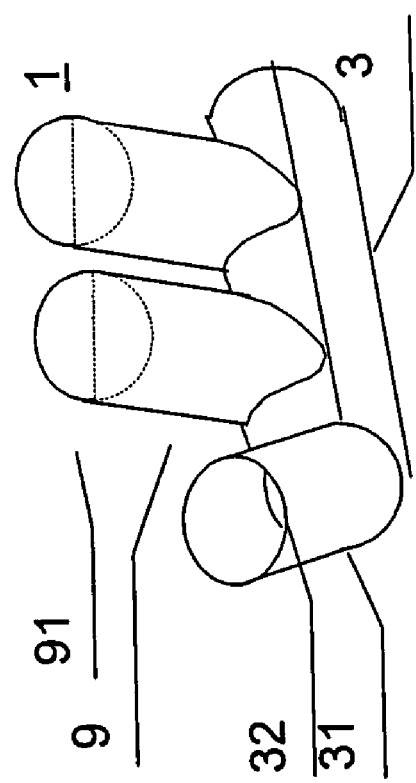
FIG. 5 is a very simplified schematic (partially transparent) perspective view similar to FIG. 3, which shows a section of a further embodiment of the invention in which several side branches are arranged running along the tube, here shown in an embodiment with two side branches arranged in a row.

In a further embodiment of the invention several side branches are arranged either running along the discharge tube 4, such as shown in FIG. 5, or abreast, such as shown in FIG. 6. It is also possible to have several side branches arranged both running along and abreast, e.g., in a 2×2 arrangement, 3×3 arrangement, 10×10 arrangement, 2×4 arrangement, or similar.

The return pipe 3 comprises in a further embodiment of the invention an end or an outlet 31 which is arranged in an oblique angle relative to the horizontal main channel of the return tube 3, in which the outlet 31 is arranged to form a desired second angle w with the main channel. The second angle w may be between 0° and about 90°, but also between about 30° and 60°. The other angle w between the central axis through the return tube 3 and the central axis through the outlet is advantageously about 45°.

The protein separator in its very simplest and original embodiment was found by coincidence because an outlet pipe 3 from a fresh water filter tank was too short. A Y-pipe junction was inserted having one straight pipe channel 90 and a 45° side channel 9, of which the straight pipe channel 90 was inserted as a section of the outlet pipe 3, and the side channel 9 was directed upward and rearward with respect to the water current in order not to disturb the water current to an unnecessary degree. It appeared that protein foam came out from the side channel 9. Originally, the inventor believed that the invention would work for fresh water only. Later experiments show that the previous assumption does not hold. The inventor now has tried to use the device for protein-added sea water, and protein is separated from that sea water too.

The outlet 31 may in one embodiment be a fixed tube section in which the outlet 31 with its spillway 32 forms a second angle w with the main channel of the return tube 3. The transition between the main channel of the return tube 3 and the outlet 31 may also be pivotable, so that the outlet 31 with its spillway is height adjustable relative to the rest of the return tube 3, so that the outlet 31 with its spillway 32 thus may be adjusted to the desired angle w and height relative to the horizontal main channel. This may be solved by having the tube articulated, e.g. by means of a ball joint. Alternatively, the complete or parts of the tube may be flexible. The complete or parts of the tube may constitute, e.g., a hose, e.g. as shown in FIG. 8. Then the outlet 31 may be easily be adjusted according to water flow and amount of protein being separated, and this leads to simpler control of the purifying process for the water.

Spillway 32 for the purified water from the outlet 31 may advantageously be arranged to be located at the same level as the water level at the intersection of the side branch 9 with the straight portion 90 of the return tube 3.

In order to remove undesired matter, such as particles, gases, slime and biological material from the circulating water, there may be arranged one or more separators 1, 7; 15 which may be located between the discharge tube 4 from the reservoir and the return tube 3 to the reservoir 2, preferably arranged between a feed tube 6 from the pump 5, and the return tube, e.g., a filter tank 1 with a particle filter 7, 3. The filter tank 1 may comprise an outlet 8 for air and gas from the particle filter 7.

The separator may also be a precipitation tank or a settling chamber 15, which may be arranged between the discharge tube 4 from the reservoir 2 and the return tube to the reservoir 2, preferably arranged between the feed tube 6 from the pump 5 and the return tube 3. This settling chamber 15 may also advantageously have an outlet for air and gas, but it may also be open to air.

In the bottom of the separator 1, 7, 15 a certain water level should be present, so that when discharging water from the separator via the return tube, air supply to the return tube 3 is avoided before skimming protein at the intersection between the straight portion 90 of the return tube 3 and the side branch 9.

During practical comparative experiments it has been observed that an insufficient purification process when the water runs through filter with a conventional outlet tube and down into the reservoir 2, without any side branch 9 being arranged in connection with the return tube 3. This seems to indicate that an insufficient amount of protein is separated by means of conventional filter tanks. When using a protein skimmer according to the invention, a protein separation process was achieved in the intersection of the side branch 9 with the straight portion 90 of the return tube 3. The foam formation that grew out of the side branch 9, allowed simple removal.

The water is not required to flow into the reservoir 2 from the return tube 3, but may also flow directly into the reservoir with the lower edge or spillway 32 of the return tube 3 in the water surface, or that the return pipe 3 has its mouth in level with the water surface or somewhat below the water surface of the basin 2.

The invention also comprises a process for purification of water by culture of fish or other water organisms in a reservoir 2, by means of a protein skimmer. The process comprises the following steps:

supply of impure or partially purified water to a return tube 3 which leads to the reservoir 2, in which the return tube comprises a generally horizontal, straight portion with one or more upwardly directed side branches 9, each with an opening 91 which leads to air, rapid flow of water past the side branch 9, while the water level is maintained at or above the intersection of the side branch 9 with the straight portion 90, as the side branch 9 is directed rearward relative to the direction of the water flow in the straight portion 90, and forms a first angle v of between 0° and about 90° with the straight portion 90, so that a protein foam is formed at the water surface at the intersection between the straight portion 90 of the return tube 3, and that the protein foam is allowed to grow upwardly from the water surface for discharge through the side branch 9; and further flow of the entirely or partially purified water further through the straight portion 90 of the return tube 3 and back directly or indirectly to the reservoir 2.

The process may also comprise the step of supply of impure water to one or more separators 1, 7; 15 with outlet for air and gas, for removal of particles, gases, slime or other biological material from the water. Waste material, such as protein or algae, which is not removed or filtered away in the separator 1, 7; 15 may then be separated in the protein skimmer, before the purified water is conducted to the reservoir 2.

FIG. 11 shows an improved preferred embodiment of the invention in different views. FIG. 11A shows a partial vertical section and view of an embodiment having an inlet pipe 6 on the top, with water distribution through several small holes from the outlet pipe 6 and down through a particle filter 7, and a longitudinal section and view of a generally horizontal outlet pipe 3 with a protein separator 9, 90 according to a preferred embodiment of the invention. The tank's 15 main portion may be constituted by a cylindrical pipe section of a desired diameter and length. In the prototype illustrated in FIG. 11 the pipe may have a diameter of 500 mm and a height of 1500 mm. Other embodiments may have much smaller diameter, e.g. Ø=50 mm, h=100 mm for small aquarium models, and e.g. Ø=2000 mm, h=5000 mm for large aquaculture embodiments. FIG. 11B likewise illustrates a partial vertical section and view of the same embodiment of the invention, seen in partial section and view straightly into the longitudinal axis of the outlet pipe 3, i.e. 90° on the view of FIG. 11A. In this preferred embodiment the straight portion 90 of the pipe or closed channel 3 a rectangular cross-section. Likewise, the intersection between the rectangular pipe 3 and the upward directed side branch pipe 9 is a plane, of which the rear wall of the side branch pipe 9, as seen relative to the water outlet direction, is inclined 45° backward with respect to the top plate 95 of the rectangular pipe 3. The inclination angle of the opposite, forward wall of the side branch 9 is less essential than for the rear wall. In the embodiment illustrated the direction of the forward wall is 90° upward with respect to the straight portion 90. FIG. 11C shows a horizontal section through the protein separator according to the invention, as seen straightly from above. In this preferred embodiment of the invention a cover 94 is also arranged on the upward directed side branch 9, and a sideward directed outlet portion 51 through which the protein foam may be fed out. The outlet portion 51 may have an inclined bottom as shown in FIG.

11B, so as for the protein foam to slide down and out under its own weight. A container may be arranged under the opening of the outlet portion 51 to keep the protein foam temporarily. The lid 94 will be useful with outdoor use of the protein separator, where one may risk that raindrops otherwise would flush the protein foam back down toward the water surface of the side branch 9. To help the feeding of the foam out from the side branch 9, a fan 52 may be arranged in one side wall of the side branch 9, said fan being oppositely arranged with respect to the outlet portion 51, 91, said fan 52 being arranged to blow horizontally toward the foam so that it is driven toward the outlet portion 51. The fan 52 may be driven by an integrated electrical motor. The fan 52 may also contribute to the drying of the protein foam and reducing its volume while forcing it away from the side branch 9 and not allowing it to run back to the water surface below the side branch 9. The fed out protein foam may then be contained and kept separate from the water that runs back to the fish basin 2.

Figure 2:
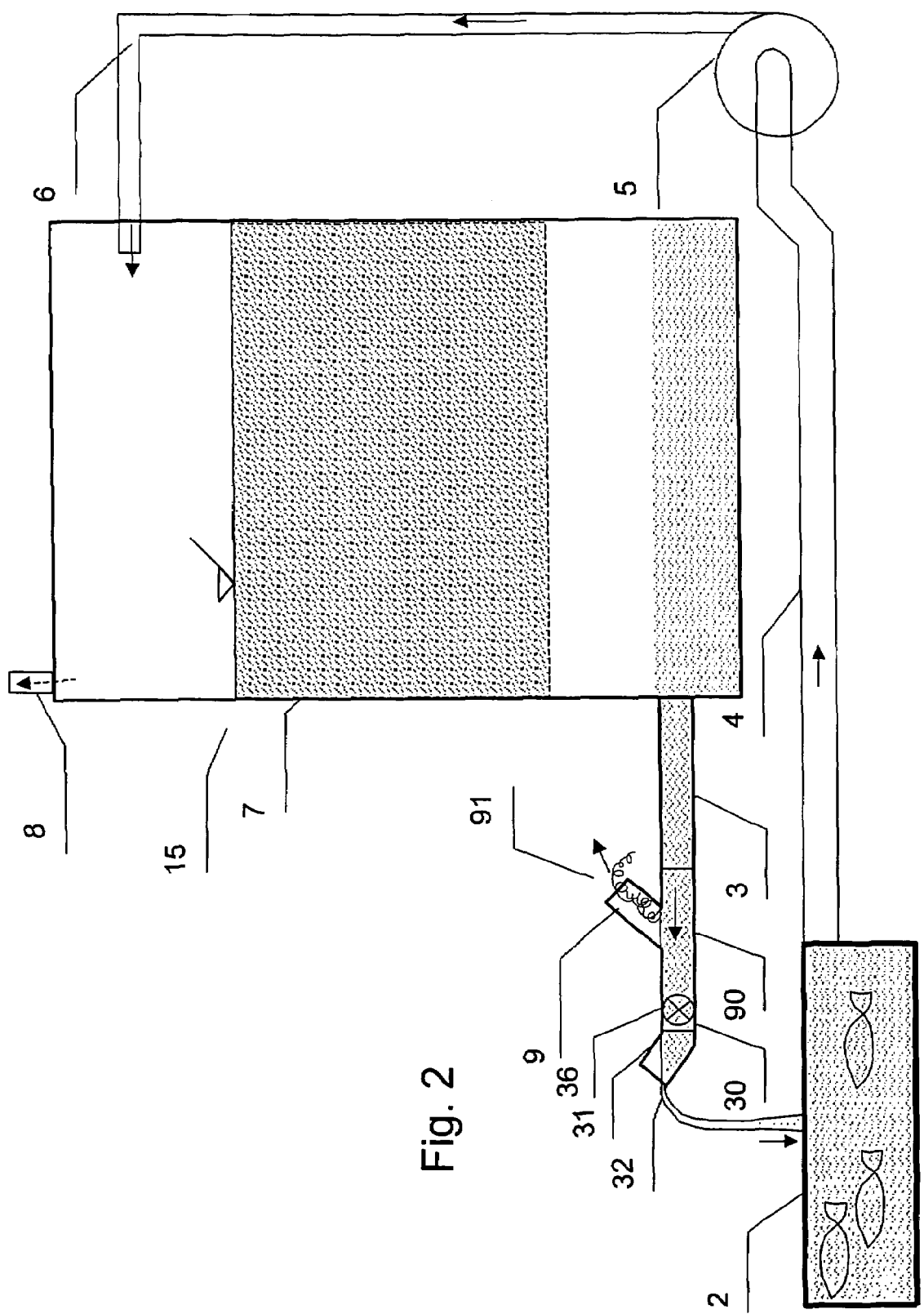
FIG. 2 is a schematic vertical section similar to FIG. 1, in which the separator is a precipitation tank or settling chamber.

The water should be relatively free of turbulence before passing the side branch 9 and the straight portion 90. The water current may be adjusted using a valve (36, shown in FIG. 2) that to a lesser degree would disturb the water flow past the straight portion 90.

The tank 15 should be provided with elevation adjustable support legs as shown in FIG. 11, so as for to adjust the entire apparatus to a vertical posture and having the straight portion 90 of the outlet pipe 3 in horizontal level. The particle filter 7 may comprise sand, or rather plastic pieces extracting gas bubbles and maybe forming bubbles being driven downward by the water current and down through the column and out through the protein skimmer.

During using the protein skimmer, it appears that particularly much foam is separated during the hours just after feeding time, i.e. during the period in which one may expect that the fish excretes particularly much protein. The applicant has conducted analyses showing that there may be nearly 40% reduction of nitrogen and nitrate, 40% reduction in phosphorus, and about 40% reduction in protein in the water of an experimental pond containing 25 m3 of water and about 20 kg live fish.

Water analysis has been conducted by Jordforsk lab, Ås, Norway. The second test sample was taken 9 days after the first test sample. The results are:

Sample numbers: M004-01348-1 M00401348-2

| Parameter | Method | Unit | Date | Marked: No. 1 | No. 2 |
|---|---|---|---|---|---|
| pH | *PH-V | — | 260504 | 6.59 | 6.64 |
| Cond. | *KOND | mS/cm | 260504 | 0.28 | 0.26 |
| Bicarbonate | HCO3-N | mg/l | 010604 | 78.4 | 84.8 |
| Chloride | *CL-IC-V | mg/l | 260504 | 7.42 | 6.77 |
| Nitrate-N | *NO3-IC-V | mg/l | 260504 | 7.06 | 4.25 |
| Phosphor | P-ICP-N | mg/L | 260504 | 1.1 | 0.78 |
| Potassium | K-ICP-N | mg/L | 260504 | 3.6 | 2.1 |
| Calcium | CA-ICP-N | mg/L | 260504 | 34.1 | 33 |
| Magnesium | MG-ICP-N | mg/L | 260504 | 3.17 | 2.91 |
| Sodium | NA-ICP-N | mg/L | 260504 | 9.4 | 9.5 |
| Sulphur | S-ICP-N | mg/L | 260504 | 6.58 | 7.16 |
| Iron | FE-ICP-N | mg/L | 260504 | <0.03 | <0.03 |
| Copper | CU-ICP-N | mg/L | 260504 | <0.02 | <0.02 |
| Manganese | MN-ICP-N | mg/L | 260504 | <0.01 | <0.01 |
| Zinc | ZN-ICP-N | mg/L | 260504 | <0.02 | <0.02 |
| Boron | B-ICP-N | mg/L | 260504 | <0.04 | <0.04 |
| Molybd. | MO-ICP-N | mg/L | 260504 | <0.03 | <0.03 |
| Alumin. | AL-ICP-N | mg/L | 260504 | 0.04 | 0.03 |

-continued

Sample numbers: M004-01348-1 M00401348-2

| Parameter | Method | Unit | Date | Marked: No. 1 | No. 2 |
|---|---|---|---|---|---|
| Silisium | SI-ICP-N | mg/l | 260504 | 0.42 | 0.31 |
| Ammon-N | *NH4-AA-V | mg/l | 140604 | <0.2 | <0.2 |
| Total N | *NTOT-AA-V | mg/l | 140604 | 7.74 | 4.68 |
| Nitrite-N + Nitrate-N | *NO2,3-AA-V | mg/l | 140604 | 7.00 | 4.23 |
| difference of Total N − (Nitrite-N + Nitrate-N): | | | | 0.74 | 0.29 |

*accredited determinations.

The difference between Total N−(Nitrite-N+Nitrate-N) indicates the amount of protein in the water, and decreases during the 9 days after the start of using an early embodiment of the protein separator. This shows that the protein separator according to the invention works according to the purpose. Also seen is that the amount of Nitrate-N decreases from 7.06 to 4.25, and that phosphorous decreases from 1.1 to 0.78.

The protein skimmer according to the invention has also been used in a simple test for purifying sea water with added excrements from chicken. The chicken excrements contain proteins. In such tests, a protein foam is separated from the sea water.

The invention claimed is:

1. A protein skimmer for use in purification of water used by culture of fish or other water organisms in a reservoir, aquarium, or tank (2) having a circulation system comprising one or more discharge tubes (4) from the reservoir (2) to a pump (5) for circulation of water, and a return tube (3) for water directly or indirectly from the pump (5) to the reservoir (2), wherein
   the return tube (3) comprises a generally horizontal, straight portion (90) with at least one upwardly directed side branch (9) which has an aperture (91) to air, in which the generally horizontal straight portion (90) is arranged for rapid passage of the water past the side branch (9) and to have the water level at or above the intersection of the side branch (9) and the straight portion (90), and
   the side branch (9) is directed rearward relative to the direction of the water flow in the straight portion (90), so that during water flow a protein foam will be formed at the water surface at the intersection of the side branch (9) with the straight portion (90) of the return tube (3), and that the protein foam is allowed to grow from the water surface for the discharge through the side branch (9), and in which the return tube (3) further is arranged to for having the entirely or partially purified water to flow further through the straight portion (90) and directly or indirectly to the reservoir (2).

2. Protein skimmer according to claim 1, wherein the first angle (v) is between about 30° and 60°.

3. Protein skimmer according to claim 2, wherein the first angle (v) is between about 40° and 50°.

4. Protein skimmer according to claim 2, wherein the first angle (v) is about 45°.

5. Protein skimmer according to claim 1, wherein one or more separators (1,7;15) is arranged between the discharge tube (4) from the reservoir and the return tube (3) to the reservoir (2).

6. Protein skimmer according to claim 5, wherein the separator is a filter tank (1) with a particle filter (7).

7. Protein skimmer according to claim 5, wherein the separator is a settling chamber (15).

8. Protein skimmer according to claim 5, wherein the separator (1, 7;15) has an outlet (8) for air and gas.

9. Protein skimmer according to claim 1, wherein the straight portion (90) has a circular or elliptic cross section.

10. Protein skimmer according to claim 1, wherein the side branch (9) has a circular or elliptic cross section.

11. Protein skimmer according to claim 1, wherein the straight portion (90) has a quadrangular cross section.

12. Protein skimmer according to claim 1, wherein the side branch (9) has a quadrangular cross section.

13. Protein skimmer according to claim 1, wherein the straight portion (90) is arranged on a lower level relative to the main channel of the return tube (3).

14. Protein skimmer according to claim 1, wherein the straight portion (90) is constricted relative to the main channel of the return tube (3).

15. Protein skimmer according to claim 1, wherein the straight portion (3) comprises an outlet (31) which is arranged in an oblique angle relative to the horizontal main channel, in which the outlet is arranged to form a desired, second angle (w) with the main channel of the return tube (3), so that the outlet (32) with its spillway (32) is height adjustable.

16. Protein skimmer according to claim 1, wherein the outlet (31) of the return tube (3) is movable relative to the main channel of the return tube (3), so that the outlet with its spillway (32) is adjustable to a second, desired angle (w) relative to the main channel of the return tube (3).

17. Protein skimmer according to claim 16, wherein the return tube (3) is entirely or partially flexible, and that the complete or parts of the return tube is constituted by a hose.

18. Protein skimmer according to claim 15, wherein spillway (32) for the entirely or partially purified water from the outlet (31) is arranged to be at the same level as the water level at the intersection of the side branch (9) with the straight portion (90) of the return tube (3).

19. Protein skimmer according to claim 1, wherein several side branches (9) is arranged either running along the discharge tube (4) or abreast, or both arranged running along and abreast of the discharge tube (4).

20. Protein skimmer according to claim 1, having a cover plate (94) over the outlet (91) of the side branch (9) so as to protect the separated protein foam in the side branch (9) against being flushed back down toward the water surface of the side branch (9).

21. Protein skimmer according to claim 1, with a fan (52) in one sidewall of the side branch (9) arranged oppositely of a sideward outlet portion (51, 91) said fan (52) being arranged to blow the foam through the sideward outlet portion (51) and for drying said protein foam.

22. Protein skimmer to claim 1, having a valve (36) arranged in the pipe (3) in or after the straight portion (90) and arranged after the side branch (9) as counted in the ordinary flow direction of the water.

23. Process for purification of water by culture of fish or other organisms in a reservoir (2), by means of a protein skimmer, the process comprising the following steps:
supplying impure or partially purified water to a return tube (3) which leads to the reservoir (2), in which the return tube (3) comprises a generally horizontal straight portion (90) having one or more upwardly directed side branches (9), each side branch having an aperture (91) open to the air;
rapidly flowing of water past the side branch (9), while the water level is maintained at or above the intersection of the side branch (9) with the straight portion (90), as the side branch (9) is directed rearward relative to the flow direction of the water in the straight portion (90), so that the a protein foam is formed at the water surface at the intersection of the side branch (9) with the straight portion (90) of the return tube (3), and that the protein foam is allowed to grow upwardly from the water surface for discharge through the side branch (9); and
further flowing the entirely or partially purified water further to through the straight portion (90) of the return tube (3) and back directly or indirectly to the reservoir (2).

24. Process according to claim 23, further comprising the following step:
supplying impure water to one or more separators (1, 7;15) with outlet (8) for air and gas, for removal of particles, gases or biological material from the water.

25. Process according to claim 23, wherein said water is fresh water.

26. Process according to claim 23, wherein said water is sea water.

* * * * *